(12) United States Patent
Ringgard

(10) Patent No.: US 6,666,507 B1
(45) Date of Patent: Dec. 23, 2003

(54) SEAT CONSTRUCTION FOR PEDAL-OPERATED CYCLE APPARATUS

(75) Inventor: John Burnham Ringgard, Tempe, AZ (US)

(73) Assignee: John B. Ringgard, Lakewood, CO (US)

( * ) Notice: Subject to any disclaimer, the term of this patent is extended or adjusted under 35 U.S.C. 154(b) by 0 days.

(21) Appl. No.: 09/235,751

(22) Filed: Jan. 25, 1999

(51) Int. Cl.$^7$ ................................................. B60N 2/38
(52) U.S. Cl. ..................................................... 297/195.1
(58) Field of Search ............................. 297/195.1, 197, 297/203, 204

(56) References Cited

U.S. PATENT DOCUMENTS

| | | | |
|---|---|---|---|
| 2,149,247 A | * | 2/1939 | Mesinger |
| 4,099,769 A | * | 7/1978 | Jacobs |
| 4,611,851 A | * | 9/1986 | Noyes et al. |
| 5,338,095 A | * | 8/1994 | Laughlin et al. |
| 5,356,205 A | * | 10/1994 | Calvert et al. |
| 5,388,887 A | * | 2/1995 | Read |
| 5,597,202 A | * | 1/1997 | Andersen |
| 5,735,578 A | * | 4/1998 | Penley |
| 5,904,396 A | * | 5/1999 | Yates |

FOREIGN PATENT DOCUMENTS

GB          300025         * 11/1928

* cited by examiner

Primary Examiner—Milton Nelson, Jr.

(57) ABSTRACT

A cycle seat construction includes an elastic membrane saddle member and a frame which attaches to peripheral portions of the saddle member and holds the center portion of the saddle member, spaced from the frame, in a stretched elastically-pliant condition. In preferred embodiments the elastic membrane is: (i) an elastomeric fabric having high resilience, and exhibiting a low slope stress/strain characteristic at initial load and a high slope stress/strain characteristic after a predetermined filament elongation and (ii) a thermoplastic elastomer sheet.

12 Claims, 6 Drawing Sheets

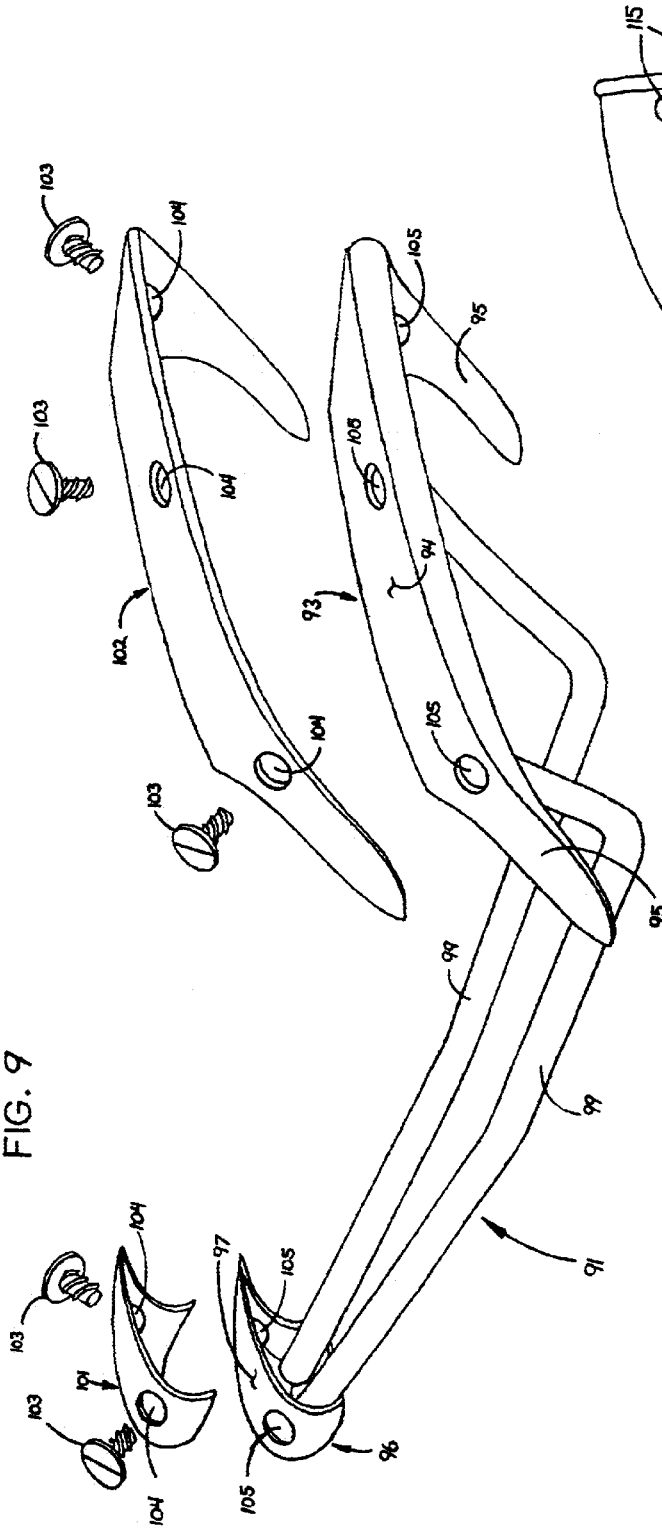

SEAT CONSTRUCTION FOR PEDAL-OPERATED CYCLE APPARATUS

BACKGROUND OF THE INVENTION

1. Field of Invention

The present invention relates to cycle apparatus of the kind operated by pedals and more specifically to improved seat constructions for such cycle apparatus.

2. Description of Background Art

In devising seat constructions for pedal operated cycles (e.g. bicycles, tricycles and exercise cycles), there are several functional needs to consider. Thus, the seat should be readily adjustable in the vertical directions to accommodate the different lengths of operators' legs. The seats have a relatively narrow width dimension across the region of the operators groin to allow efficient transmission of force down to the pedals. And, of course, the seat should reliably support such weight as the operator desires to rest upon it.

These more basic functional needs have caused the seat designs for pedal-operated cycles to comprise: (i) a relatively rigid saddle portion shaped to be straddled by the thighs and support the buttock , (ii) means formed on, or attached to, the underside of such saddle portion, for mounting the seat to a vertically adjustable post element(s) of the cycle apparatus and (iii) some kind of cushioning means formed on , or attached to, the top and/or sides of the saddle portion. The solid saddle portion usually has an outline approximating an isosceles triangle, with the narrowing front side region curved inward slightly for straddling and the wider, rear base region for seating.

Some bicycle seat constructions feature relatively wider rear base portions and comprise a metal plate which is covered with padding and a leather or plastic covering. The plate can be supported to the mounting post with intermediate coil springs providing further cushioning. For sporting bicycles, the seat constructions have featured longer, narrower—base outlines and comprised a relatively thick and hard leather or plastic saddle element that is mounted over a rail frame. Thus, FIG. 1 illustrates one such prior art seat construction 10 where a frame, denoted generally 11, includes front and rear plate portions 12, 13 that are supported in a spaced relation by a pair of elongated rails 15. The rails 15 enable attachment of the seat to the adjustable post of a bicycle (not shown), and the plate portions 12 and 13 mount the saddle portion 16. The saddle portion 16 is formed of relatively thick and stiff leather that is shaped and sewn to fit over plates 12 and 13, with side wall portions 18 curving downwardly to protect the thighs of the rider from contacting the frame 5.

Another prior art seat 20 is shown in FIG. 2 and comprises a molded plastic saddle portion 26 having cylindrical recesses 27 that are adapted to fit upon the spaced ends 22, 23 of rails 25. The saddle portion 26 has a rear base from which sides taper forwardly inward. The sides extend downwardly so that portions 28 shield the rider's thighs.

The prior art seat designs shown in FIGS. 1 and 2 achieve the above noted functional needs in relatively simple, inexpensive and easily manufacturable constructions. While padding can be coupled into the saddle portions, their inherent stiffness, provided for riders support, prevents the degree of comfort that existed on the seats comprising spring supports. In many instances the saddles provide what is plainly stated, a very hard seat. Moreover, these prior art seats do not conform easily to different body shapes, so that their saddle side walls can chafe a rider's inner thighs. Also, the solid surfaces of the prior art constructions provide poor ventilation so that perspiration can accumulate when riding vigorously or in regions of prolonged contact between riders and seat.

SUMMARY OF THE INVENTION

One significant objective of the present invention is to provide new seat constructions for pedal-operated cycles which offer advantages in cushioning, body conformity and ventilation, as well as advantages in manufacturing simplicity and cost. Certain embodiments of the present invention provide further advantages in that the saddle portion of their seat construction can be easily and inexpensively replaced, after damage and wear. In addition, the seat constructions according to the present invention are extremely light weight, which also is very advantageous e.g. for use on racing cycles.

In one aspect, the present invention constitutes improvements in cycle seat constructions of the kind having a saddle portion for directly supporting the operator and frame portion for supporting the saddle portion and for coupling to a cycle. The improvements include: (i) the saddle portion comprising an elastic membrane having peripheral attachment means and (ii) the frame portion comprising means for engaging the attachment means and holding the saddle portion with the membrane in a stretched, elastically-pliant condition and a central region of the membrane spaced from the frame portion.

In one preferred embodiment the membrane of the saddle portion comprises an elastic fabric. In particularly preferred embodiments the fabric comprises a combination of segmented polyurethane-urea polymer and thermoplastic elastomer filaments.

BRIEF DESCRIPTION OF THE DRAWINGS

The subsequent descriptions of preferred embodiments of the invention refer to the accompanying drawing wherein:

FIG. 9 is a perspective view of another alternative frame portion in accord with the present invention;

FIG. 10 is a bottom view of another alternative saddle portion for cooperating in accord to the present invention with the FIG. 9 frame construction and;

DETAILED DESCRIPTION OF PREFERRED EMBODIMENTS

Figure 1:
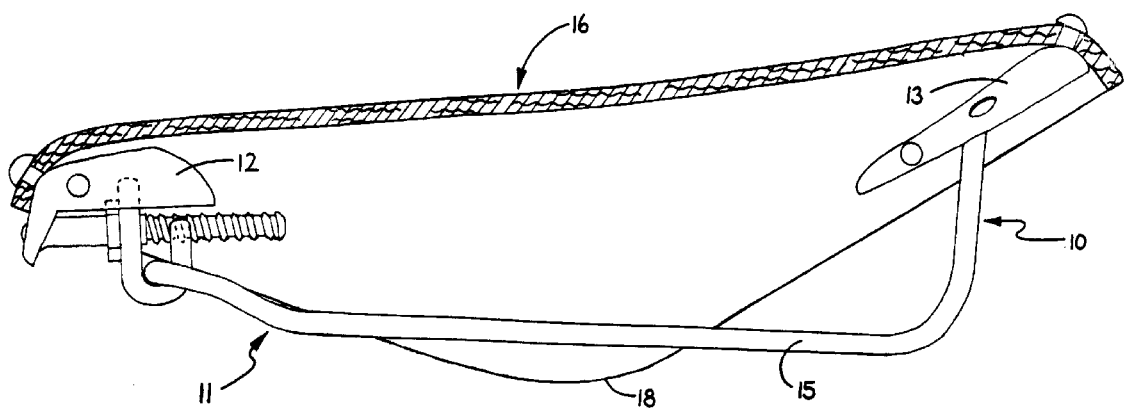
FIG. 1 and FIG. 2 are schematic side views of the prior art seat constructions discussed above.
Figure 2:
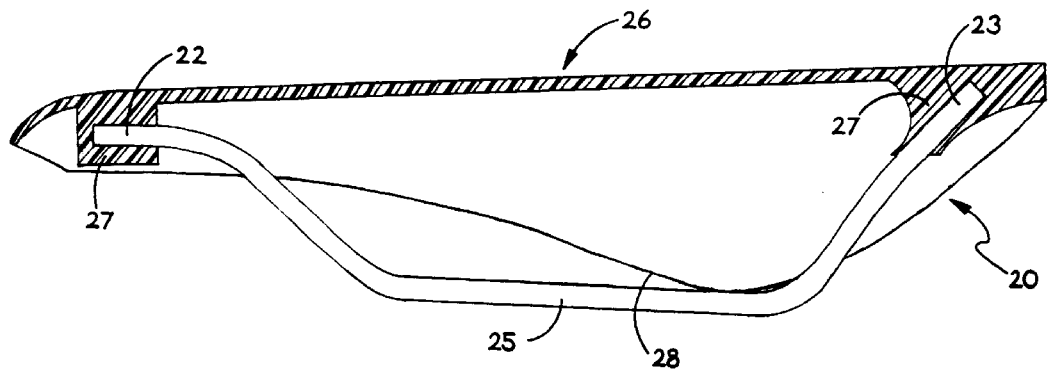
Figure 3:
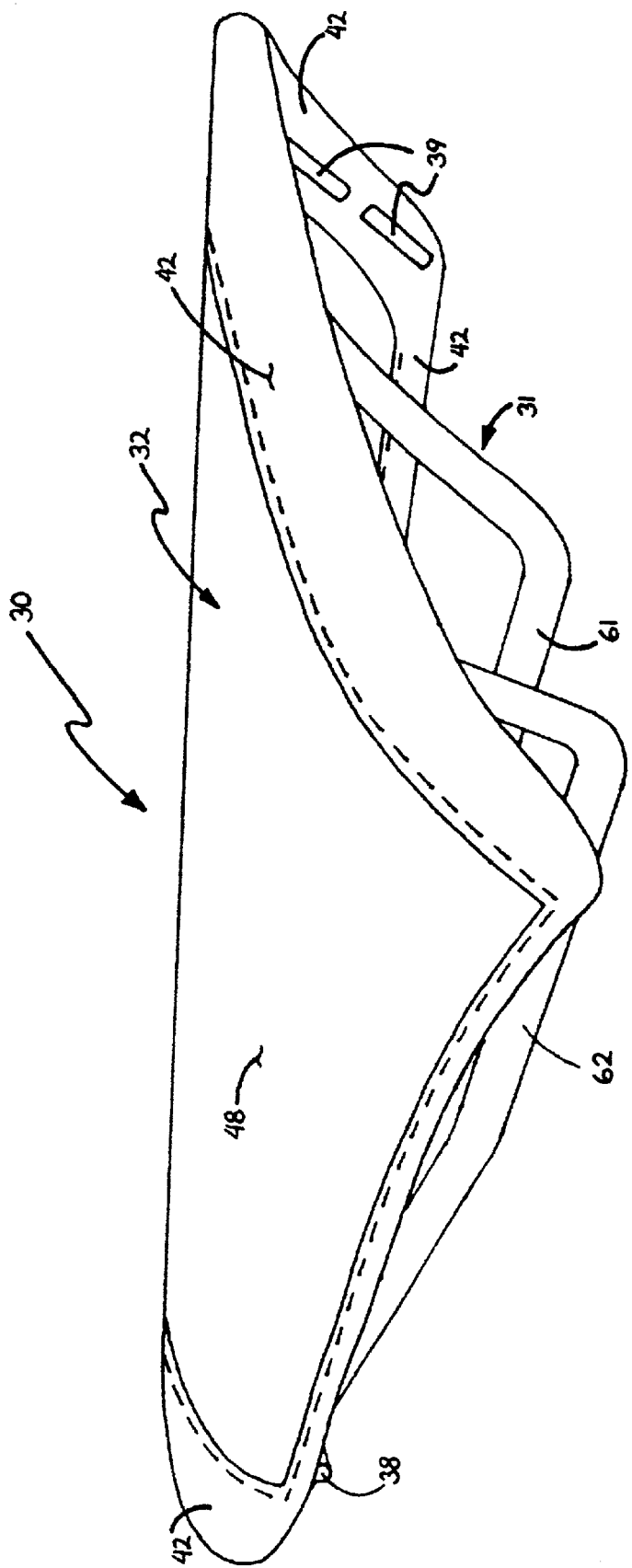
FIG. 3 is a perspective view of one preferred seat construction according to the present invention.
Figure 4:
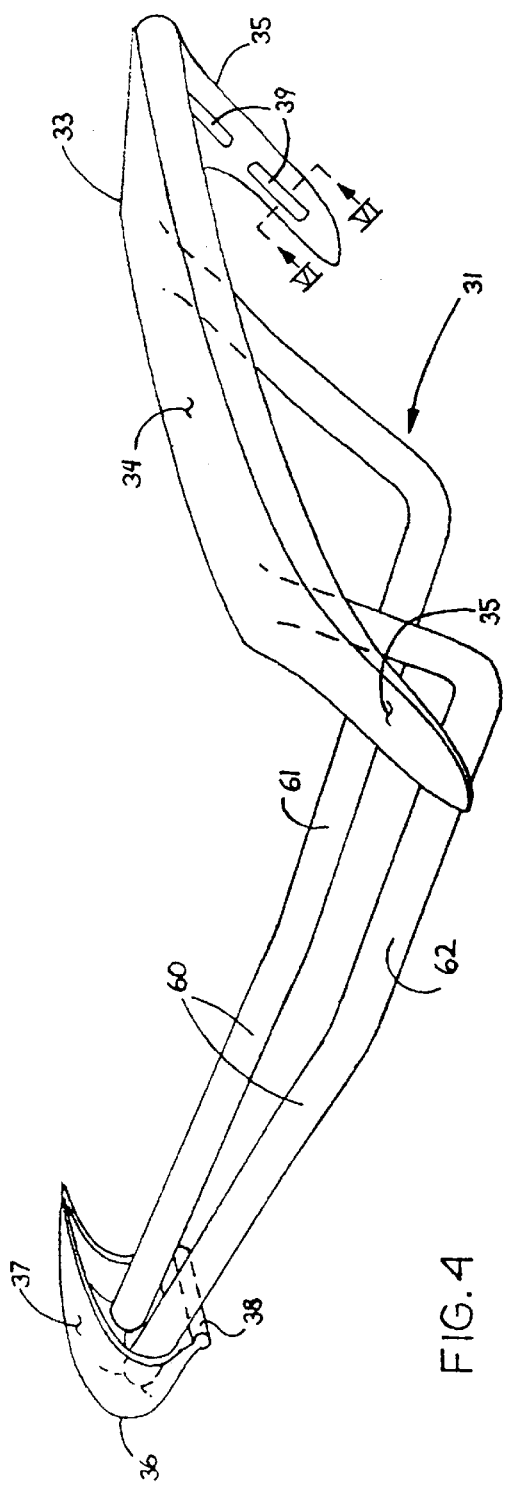
FIG. 4 is a perspective view of the frame portion of the FIG. 3 seat construction embodiment.
Figure 5:
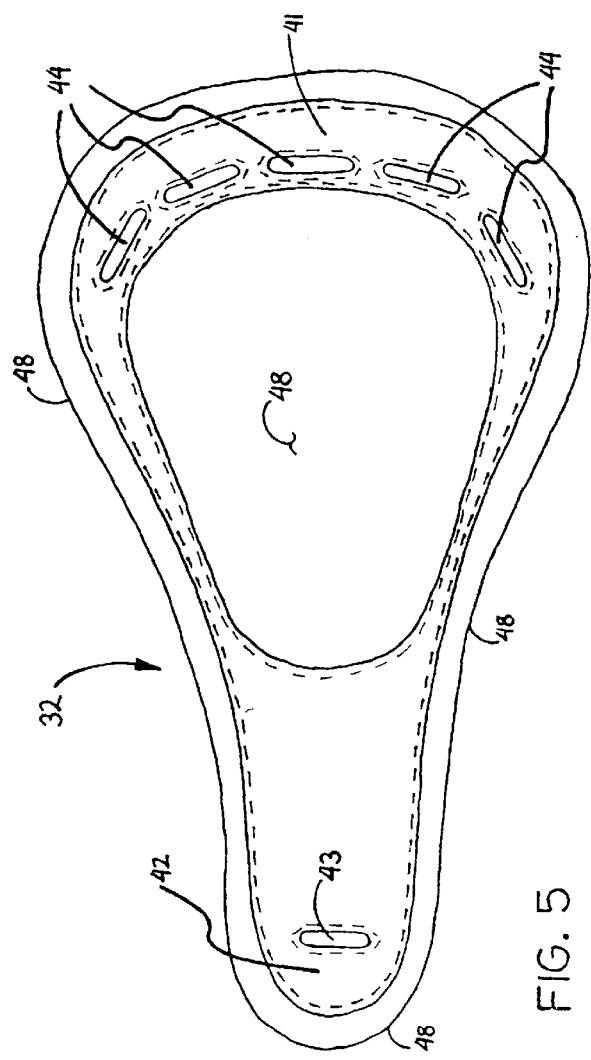
FIG. 5 is a bottom view of one preferred saddle portion for the FIG. 3 seat construction embodiment.

FIGS. 3–5 illustrate one preferred embodiment of the present invention. The seat construction 30 is shown in an assembled condition in FIG. 3 and, in general, comprises two detachable portions, viz., a frame 31 (shown separated in FIG. 4) and a readily replaceable elastic membrane saddle 32 that is stretched over the frame. The saddle 32 is shown separated in an unstretched condition, in FIG. 5.

The frame portion 31 is specifically constructed to stretch and hold the saddle portion 32 in a stretched condition as a compliant seat form, which, in this embodiment, has the general shape of an isosceles triangle. For supporting and stretching the saddle portion 32, frame portion 31 has (see FIG. 4) a rear support member 33 along the triangle base and a front support member 36 located at the triangle vertex. The rear member 33 has a rear support surface 34 forming a plurality of rear support regions that define the rear width of the saddle 32, when it is stretched thereover. In the FIG. 4 embodiment the rear member 33 has downwardly extending, curved side wall elements 35, which support the saddle when it is stretched thereover, to provide curved side skirts that can readily yield to the rider's interior thigh surfaces.

Figure 6:
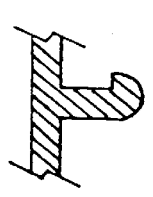
FIG. 6 is a cross section (viewed along direction VI—VI of FIG. 4) showing one preferred attachment peg construction for the FIG. 4 frame embodiment.

The front support member 36 of frame 31 has a rounded cone-tip configuration and has a front support surface 37 forming a front support region that defines the tip of the saddle when the elastic saddle membrane is stretched over the frame. The lower portion of the front support member 36 has an attachment peg 38, and the bottom and inner surfaces of rear member 33 and wall elements 35 have a plurality of similar attachment pegs 39, all such as is shown in more detail in FIG. 6. The attachment pegs 38 and 39 are formed at locations along the surfaces of member 33 and elements 36 to correspond to the locations of apertures 44, 43 in saddle 32, as subsequently described.

The front and rear support members 36 and 33 are held in a specific spaced relation, which defines the length of the seat construction, by a pair of rails 60. Also, the width of surface 34 and downward extent of side wall elements 35 are predeterminedly dimensioned to cooperatively stretch, shape and support the rear of the elastic membrane saddle 32. As shown the rails 60 extend well below the curvilinear plane defined (for a stretched saddle membrane) by support surfaces 34, 37 and well interior of the seat skirt region similarly defined by side wall elements 35 and the sides of cone 36. In this manner a supported and stretched elastic membrane of the saddle 32 is free to yield inwardly to interior thigh pressure of the rider and downwardly to pressure from the weight of the riders groin and buttock. It will be noted that rails 60 have attachment regions 61, 62 which are adapted to be clamped to a cycle post in a known manner.

The saddle portion 32 shown in FIG. 5 has an outline generally similar to the triangle shape defined by surfaces 34, 37 of frame 31, but is predeterminedly smaller in size. When the saddle is stretched over the surfaces 34, 35 and 37 of the frame and its reinforced peripheral border portions (i.e. rear border portion 41 and front border portion 42) are attached via apertures 44 and 43, to pegs 39, 38 on the frame undersides, the main elastic membrane 48 stretches to provide a compliant cushioning seat form, as shown in FIG. 3.

Thus an important feature of the present invention is that the interior body of the saddle is formed of an elastic membrane material. The membrane material can be formed in various modes, but it is preferred that the material be formed to yield easily up to a predetermined strain condition, and then have substantial resistance to further strain. In this manner adequate yield for conformity and cushioning of the body is provided, while adequate protective support (e.g. to maintain spacing from bars 60) exists at the material's strain resistant condition.

One highly desirable class of elastic membrane materials for saddle portion 48 comprises woven or knitted fabrics formed of synthetic elastic strands. One particularly preferred kind of such fabric material comprises fabrics formed of the LYCRA® Spandex filaments that are manufactured by Du Pont Textile Division at Waynesboro, Va. These materials are polymers comprising primarily segmented polyurethane-urea and can be coalesced monofil fiber, supplied as zero twist in which the individual filaments are joined to form a multifilament-like yarn. The materials can be core-spun, plied or covered with a staple fiber, e.g. cotton, to provide a texture like the staple, or with another filament, e.g. nylon or polyester to control the stress-strain characteristics of the fabrics manufactured therewith. These materials are available in heavy denier monofil yam, e.g. denier 840 to 2240, which are preferred for saddle constructions in accord with this invention. These materials can be woven, circular knit or warp knit to provide fabrics useful for saddle constructions of the present invention. Particularly preferred materials are woven fabrics having heavy denier in the range noted above and covered with polyester or nylon.

Figure 11:
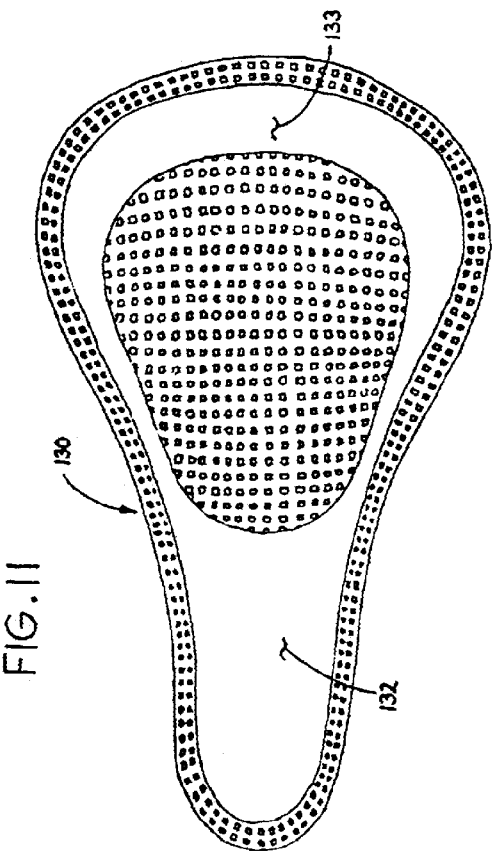
FIGS. 11–14 are bottom views of further alternative saddle portion constructions for practice of the present invention, e.g. for cooperating with frame embodiments such as shown in FIGS. 4 or 7.

Another particularly preferred kind of elastic membrane for saddle portion 48 comprises membranes (e.g. fabrics or extruded or cast thin, flexible sheets) formed of HYTREL® thermoplastic elastomers, which are manufactured and sold by Du Pont. Such materials are block copolymers comprising a hard crystalline) segment of polybutylene terephthalate and a soft segment based on long-chain polyether glycols. These materials provide exceptional toughness and resilience, high resistance to creep, impact and flex fatigue and flexibility at low temperatures. Specific properties are determined by the ratio of hard to soft segments and the segment make-up. The hardness of these materials are measured on the Shore D scale of durometer hardness. To protect from UV radiation the materials used in saddle constructions can contain UV stabilizers or fine particle size carbon black. For use in saddle construction the materials can be formed into flexible sheets by a variety of thermoplastic processing techniques, e.g. molding, extrusion or casting. In one preferred fabrication, the Hytrel® thermoplastic elastomer can be molded to attach to the seat frame ends and have an integral, thin, central membrane portion which is elastically compliant to the rider. To provide ventilation such sheets can comprise pluralities of fine perforations, e.g. molded or subsequently formed through their major surfaces. FIG. 11 illustrates a seat saddle construction 130 fabricated of such an apertured membrane. A particularly preferred membrane saddle of the construction noted above would have a soft to medium hardness e.g. about 30 to 45 on the Shore D scale of durometer hardness.

In another preferred embodiment using thermoplastic elastomers, the materials are formed into high strength elastomeric filaments. Such filaments are used in fabrics of DuPont Dymetrol® seating support systems. These fabrics are used in automobile and furniture seating in frames having the elastomeric filament running across the roll in a woven combination with polyester warp yarns. The soft to medium (i.e. 100 to 125, shore C scale) sateen weave fabrics of such materials can be used for saddles of the present invention. However, in preferred embodiments of the present invention, using thermoplastic elastomeric filaments, the elastomeric filaments are woven in both the warp/woof weave directions to provide optimum conformance to the seat frame mount structure and compliance to the pressure exerted by the cycle rider. A particularly preferred weave of such fabric comprises filaments of soft to medium hardness e.g 30 to 45 on the Shore D scale of durometer hardness.

Particularly preferred saddle construction in accord with the present invention comprises interwoven combinations of the nylon or polyester covered Spandex filament of segmented polyurethane urea (described above) and the thermoplastic elastomer filaments of segmented polyester. The later filaments provide exceptional weave strength and durability and the former filaments provide softness and elasticity. Such Spandex filaments are selected from the heavier denier range e.g. about 840 to 2240 denier and such thermoplastic elastomers are selected from soft to medium hardnesses e.g. about 30 to 45 on the Shore D scale. One highly desirable embodiment of this kind of saddle construction comprises multi strand yarns or threads comprising covered Spandex and thermoplastic elastomer plys that are twisted together with such yarn or threads and then knitted or loosely woven to form a fabric providing good elasticity, solid support and plentiful air flow ventilation.

Another kind of elastic membrane material for saddle portions according to the present invention can comprise Alcryn® melt-processable rubber manufactured and sold by DuPont. Such materials can be extruded, injection-molded, blow molded, calendered and vacuum formed to provide mid-performance elastomer membranes or seat forms.

Figure 7:
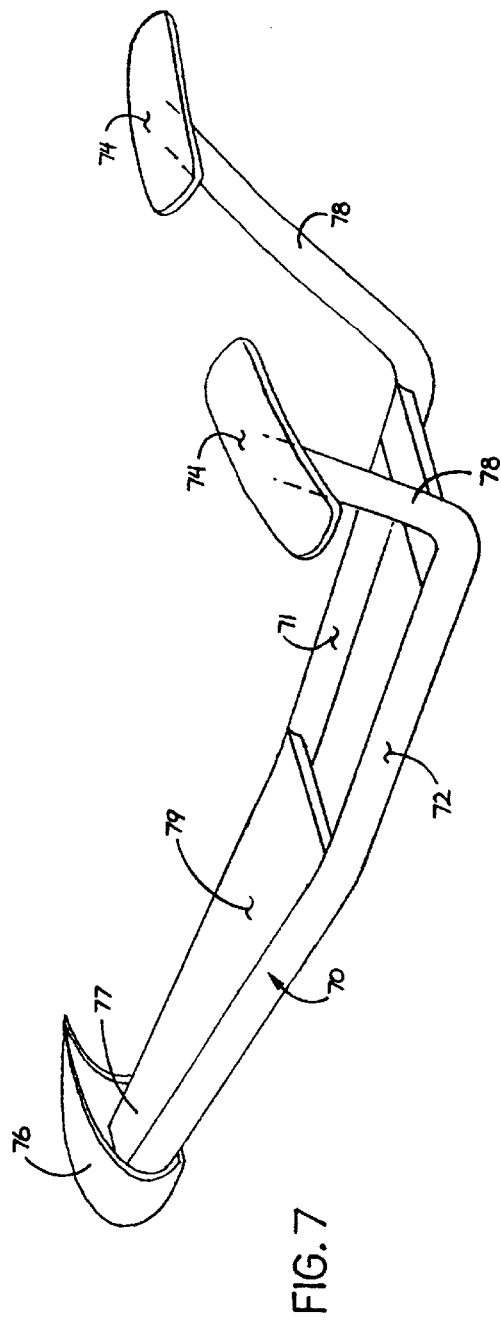
FIG 7 is a perspective view of an alternative frame portion construction in accord with present invention.

FIG. 7 illustrates an alternative preferred embodiment of frame according to the present invention. Thus frame 70 illustrates that rear support can be provided by two or more discrete surfaces 74 spaced to define the rear base of the seat construction. This frame embodiment also illustrates that the coupling structure for front support 76 and surfaces 74 can be a plate 79 having bifurcated end portions 78 and an aperture to provide surfaces 71,72 for clamping to the cycle post.

Figure 8:
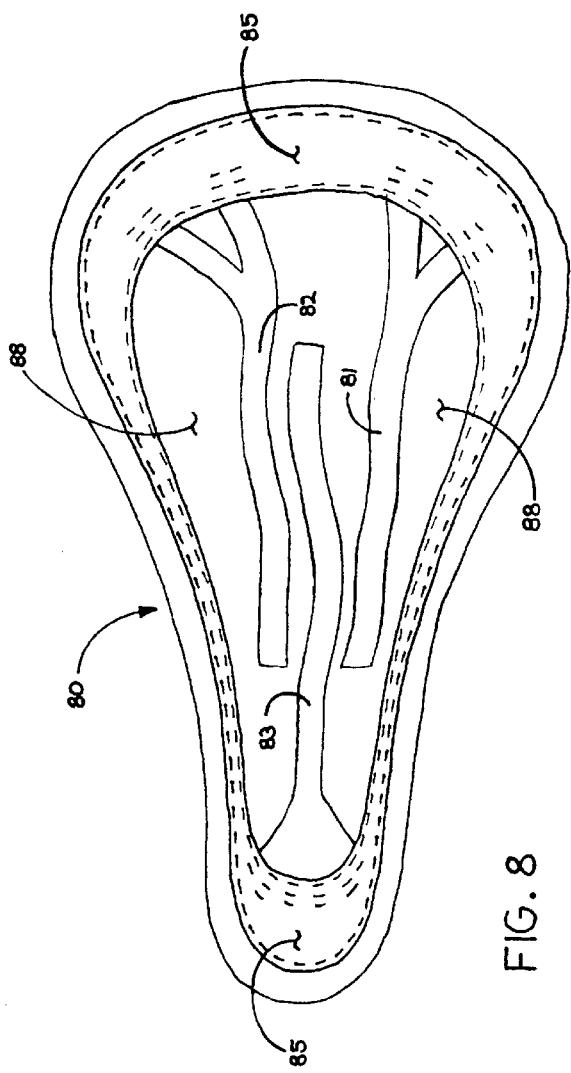
FIG. 8 is a bottom view of an alternative saddle portion for cooperation with the FIG. 7 frame portion.

It will be noted that the frame embodiment shown in FIG. 7 has no attachment pegs. Instead, the membrane saddle member 80 shown in FIG. 8 has rear tie members 81, 82 and front tie member 83. The tie members are securely attached, e.g. sewn, to the reinforced perimeter border material 85 of the saddle 80 and are located to be tied together or to end portions 78 and the front neck 77 of frame 70. The main body 88 of the saddle 80 can be formed in any of the constructions described above with respect to FIG. 5.

FIG. 9 illustrates a frame 91 which is similar to the frame described with respect to FIG. 4, but which comprises alternative saddle attachment means. Thus frame 91 includes front and rear support members 93, 96, with surfaces 94 and 97 adapted to support a seat saddle, and has connecting rods 99 and side wall elements 95 such as the FIG. 4 frame. However, instead of peg attachment means, frame 91 comprises front and rear attachment plates 101, 102 constructed to interfit over surfaces 97, 94. The plates are attachable to the frame by threaded bolts 103 which extend through plate apertures 104 and screw into threaded apertures 105 in the frame 91.

The saddle member 110 shown in FIG. 10 is constructed to interfit with the FIG. 11 frame and comprises an elastic membrane portion 111, for example formed of a Hytrel® thermoplastic elastomer sheet with apertures 115 which are located to align with the apertures of the frame and plates when the elastic body 111 has been stretched to proper relation between the front and rear support members 96, 93. The plate is then secured over the reinforced portions and the bolts 103 fastened into the threaded portions 105 to firmly secure the saddle member 110 in its properly stretched condition.

Figure 12:
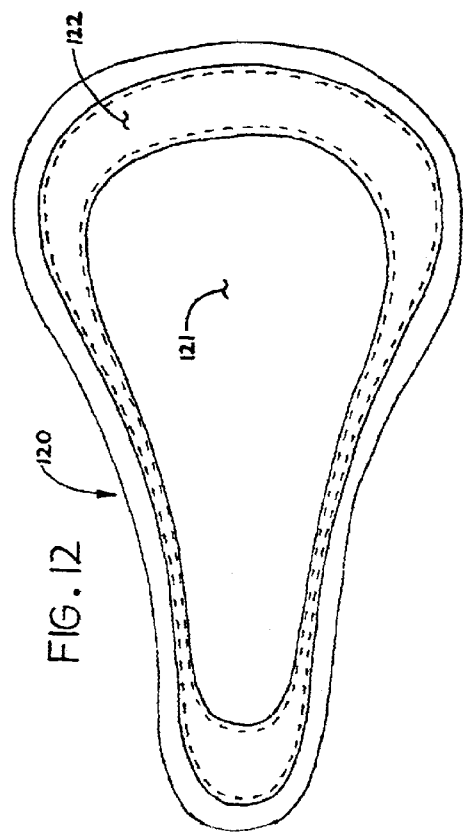

FIGS. 11–14 illustrate other preferred saddle constructions having alternative means for attachment to frames such as shown in FIGS. 4 or 7. Thus saddle 130 shown in FIG. 11 has an extended reinforced portion 132 that extends rearwardly from the tip of the saddle bottom. With this embodiment the tip is pulled like a sock over the front of the frame and then the saddle stretched so that the rear reinforced portion 133 will fit securely over the rear support member and side elements of the frame. FIG. 12 illustrates a saddle portion 120 also formed as a sock construction, but in which the central portion 121 is elastic and the peripheral portion 122 is formed of densely woven fibers of high tensile strength which are not elastic. The elastic central portion 121 is sandwiched and sewn to the peripheral attachment portion 122.

Figure 13:
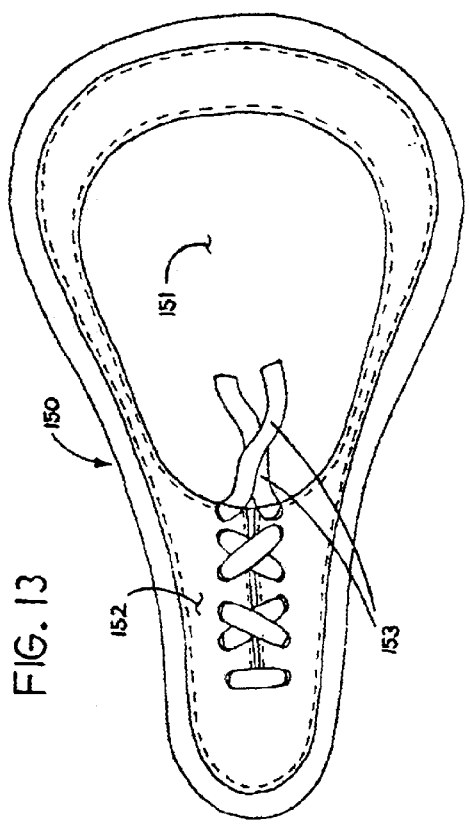

FIG. 13 shows a similar saddle configuration 150; however, the extended reinforced portion 152 is slit and provided with laces 153, which can be opened to facilitate mounting onto the frame and then pulled closed to stretch the central portion 151 and secure the saddle on the frame.

Figure 14:
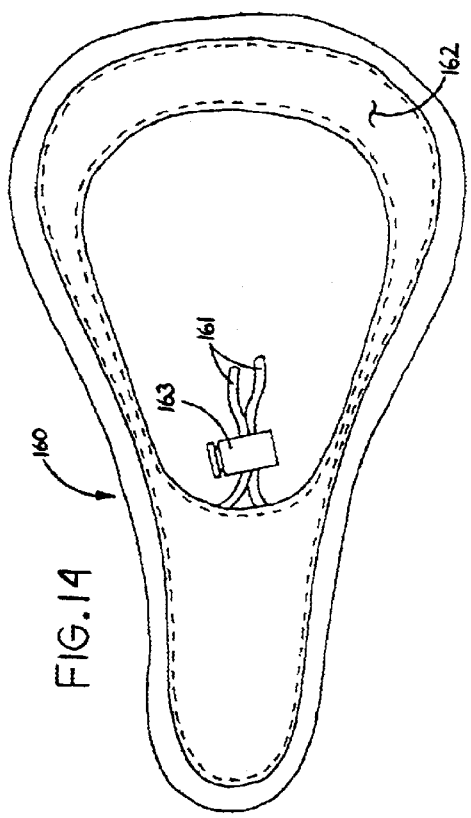

The saddle 160 of the FIG. 14 is similar to the one shown in FIG. 13 but comprises a draw string 161 that extends around the entire periphery of the reinforced portion 162. The string 161 can be loosened to allow attachment, then pulled tight to stretch and secure the saddle on the frame. A push clamp 163 is provided to retain the draw string in a tight condition. One skilled in the art will understand that various combinations of the attachment means discusses above, as well as other equivalent ones can be used.

The invention has been described in detail with particular reference to preferred embodiments, but it will be appreciated that variation and modifications can be effected within the spirit and scope of the invention. For example other frame configurations and attachment modes will occur to those skilled in the art, as will other elastic membrane constructions for effecting the precepts of the invention.

I claim:

1. A cycle seat construction for supporting a cycle rider with dynamic pliancy, said cycle seat construction comprising:
   (a) a saddle member having: (i) a shape, generally approximating an isosceles triangle, with a front vertex portion and a rear base portion; (ii) front and rear attachment means formed respectively on said front vertex and rear base portions and (iii) a central seating portion extending between said front and rear attachment means and consisting essentially of a polymer web having substantial elasticity,
   (b) a frame member comprising: (i) rear support means including (1) top surfaces for supporting central regions of said rear base portion of said saddle member generally in a top, support plane and (2) side surfaces extending downwardly from opposite ends of said top surfaces for holding flank regions of said rear base portion of said saddle in side support planes; (ii) front support means for holding central and flank regions of said front vertex portion of said saddle member respectively in said top and side support plane; and (iii) a frame body portion having (1) means for coupling to a cycle apparatus and (2) rail members that extend between said side planes and between said top planes to hold said front and rear support means in a fixed, spatial relation; said front and rear support means being constructed and located, with respect to said attachment means on said front vertex and rear base portions of said saddle member so that said elastic polymer web solely forms said central seating portion of said saddle member and is stretched in space between said front and rear support means in a curvilinear plane that provides elastically-pliant support for buttocks, groin and thigh of a cycle rider.

2. The invention defined in claim 1 wherein said polymer web is constructed to be elastically compliant to the weight of a seated rider.

3. The cycle seat construction defined in claim 1 wherein said front and rear attachment means of said saddle member are constructed to interfit respectively with said front and rear support means and wherein said elastic polymer web is constructed to: (i) stretch to allow facile interfit attachment of said attachment means to said support means without any mechanical adjustment of said frame member and (ii) elastically contract to retain such interfit attachment during seat use.

4. The invention defined in claim 3 wherein said elastic web comprises segmented polyurethane-urea filaments and thermoplastic elastomer filaments twisted together with staple fibers and interwoven to be highly air-pervious.

5. The invention defined in claim 3 wherein said front and rear support means of said frame member each include peg means and said attachment means of said saddle member comprise apertured regions constructed to interfit onto said peg means.

6. The invention defined in claim 1 wherein said web element comprises an elastic polymer fabric.

7. The invention defined in claim 6 wherein the warp and woof of said elastic fabric each contain elastomeric filaments.

8. The invention defined in claim 7 wherein said filaments contain a soft fiber.

9. The invention defined in claim 8 wherein said filaments comprise monofil yarns in a range from about 840 to 2240 denier.

10. The invention defined in claim 9 wherein said filaments further include thermoplastic elastomers with hardnesses in a range from about 30 to 45 on the shore D scale.

11. A cycle seat construction for supporting a cycle rider with dynamic pliancy said cycle seat construction comprising:
  (a) a saddle member having: (i) a generally triangular shape with a front vertex portion and a rear base portion (ii) front and rear attachment means formed on said front vertex and rear base portions; (iii) a central seating portion extending between said front and rear attachment means and consisting solely of a fabric web having substantial elasticity; and
  (b) a frame member comprising: (i) rear support means for releasably attaching to said rear attachment means of said saddle member and for supporting said rear base portion of said saddle member into a curvilinear plane extending over the top and sides of said frame member; (ii) front support means for releasably attaching to said front attachment means of said saddle member for supporting said front vertex portion of an attached saddle member in the curvilinear plane dictated by said rear support means and (iii) central frame means for connecting said front and rear support means in a fixed spatial relation and for coupling said frame member to a cycle apparatus;
   said front and rear support means being constructed and located so that said elastic fabric web, solely forms the central seating portion of said saddle member and is stretched in space between said front and rear support means in a curvilinear plane that provides dynamically-pliant support for buttocks, groin and thighs of a cycle rider.

12. The invention defined in claim 11 wherein said fabric web is constructed to be elastically compliant to stretch significantly and conform to the seated body portion of a rider.

* * * * *